Nov. 24, 1970  E. H. CORNWELL  3,542,564
METHOD FOR PREPARING COAGULATED MEAT CHUNKS
Filed Feb. 12, 1969
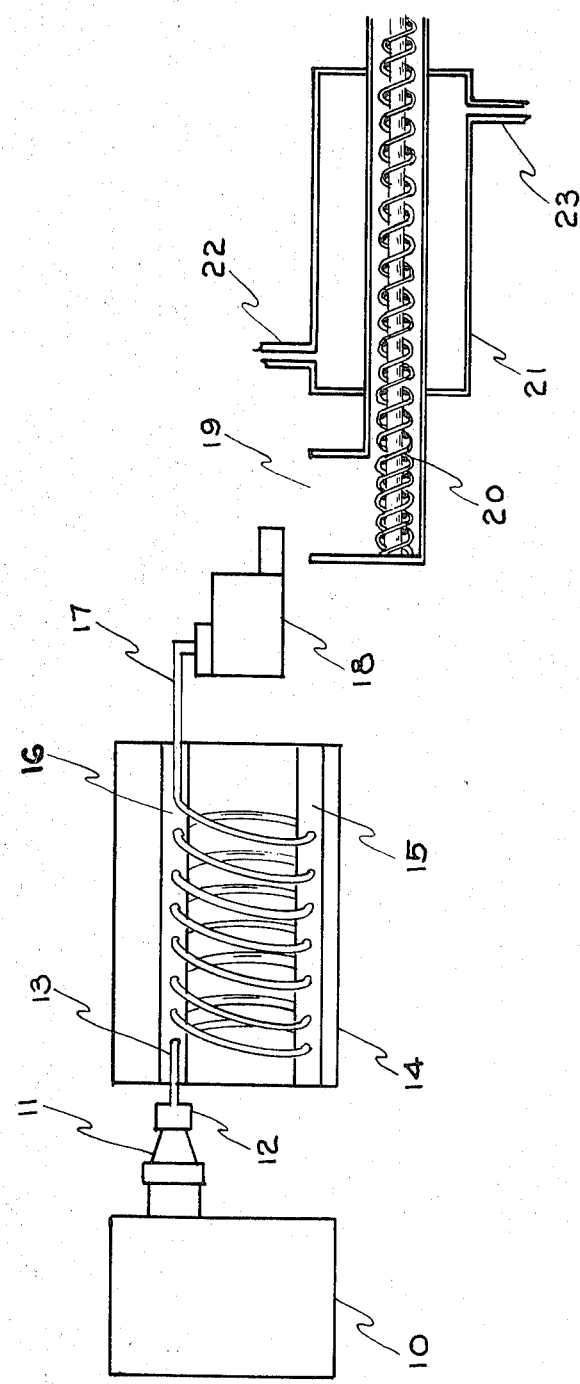
INVENTOR.
EDMUND H. CORNWELL
BY
E. T. McCabe
ATTORNEY

United States Patent Office 3,542,564
Patented Nov. 24, 1970

3,542,564
METHOD FOR PREPARING COAGULATED MEAT CHUNKS
Edmund H. Cornwell, Oak Lawn, Ill., assignor to Swift & Company, Chicago, Ill., a corporation of Delaware
Continuation-in-part of application Ser. No. 603,896, Dec. 22, 1966. This application Feb. 12, 1969, Ser. No. 798,691
Int. Cl. B02c 18/00
U.S. Cl. 99—108  7 Claims

ABSTRACT OF THE DISCLOSURE

A continuous method of preparing coagulated meat pieces or chunks suitable for incorporation into canned foods including the steps of coarse grinding fresh meat with optional ingredients and forcing the ground meat through an elongated forming zone and simultaneously coagulating the compacted meat particles with a heat source surrounding the forming zone, comminuting the meat to the desired size, and passing the comminuted meat and the original liquid fat and meat juices through a heat exchanger to congeal the liquids about the coagulated meat chunks in the ratio of the fresh meat.

---

This is a continuation-in-part of application Serial No. 603,896, filed Dec. 22, 1966, now abandoned.

The present invention relates generally to a method for preparing meat products, and more specifically, to a method for preparing coagulated meat pieces or meat chunks surrounded with congealed meat fat and juices in the ratio of the fresh meat which are suitable for incorporation into meat-containing canned foods.

Various meat-containing canned foods are presently being marketed. These foods include such products as chili, stew, noodles and beef, and the like. One of the major problems encountered by the producer in manufacturing such items is that of the preparation of the meat pieces or chunks to be incorporated therein. It is currently the practice to prepare these meat pieces by roughly grinding meat to sever the connective tissue, then pressing the roughly ground meat into the desired size, coagulating the meat pieces with heat to promote retention of the size of the meat pieces. Obviously, this process is both time consuming and expensive because of the separation of the fat and other meat juices during the coagulation of the coarsely ground meat pieces. This separation necessitates the collection of the liquid fat and meat juices, their being chilled to a solid state and thereafter being analyzed to insure their being mixed with the congealed meat chunks in their original ratio.

This invention is directed to a continuous method for preparing coagulated meat chunks having a distinctly improved texture and which are automatically surrounded by the congealed fats and meat juices in the ratio of the fresh meat. The superior meat texture results from the simultaneous compacting of the coarse ground meat and the coagulation of the meat proteins. The improved texture of the final meat chunks and the automatic recombining of the sized meat chunks with their natural juices which are necessarily separated during the coagulating step produces an end product having unexpected improved texture at a substantial savings in time and other production costs. The unique advantages of this method become apparent over the methods disclosed in U.S. patents issued to G. Christianson et al., No. 2,860,991 issued November 18, 1958 and to E. H. Rongey et al., No. 3,346,399 issued Oct. 10, 1967 which are directed to the production of various self-sustaining forms of bologna emulsion-base sausages. The meat emulsions employed in these references are distinctly different in their texture, contents and characteristics from the coarse ground meats used for incorporation into canned meat products such as chili. Meat emulsions suitable for bologna type sausage are finely ground and require a minimum of compacting to produce the intimate contact required to produce a rod-like bologna. The present invention employs very coarsely ground meat comprising, for the most part, the cheaper cuts of meat, such as flanks, plates and short plates. The fat contents of these cuts are substantially higher than that contained in the meat emulsions used by either of the above references and produces entirely different operating conditions.

Therefore, it is an object of the present invention to provide a rapid and economical method for continuously producing meat pieces suitable for incorporation into meat-containing canned foods.

It is another object of the present invention to provide a process for continuously preparing coagulated meat pieces by extruding coarse ground meat through an elongated forming zone and simultaneously coagulating the meat from a heat source surrounding the forming zone, comminuting the coagulated meat proteins to the desired size and thereafter chilling the coagulated meat chunks in the presence of the original fat and meat juices to insure their being retained in a same ratio as the fresh meat.

Additional objects, if not specifically set forth herein, will be readily apparent to one skilled in the art from a reading of the following detailed description of the invention.

Generally, the present process comprises first the step of reducing the particle size of the meat pieces to sever the connective tissues. Normally, this reduction is accomplished using a grinder having a $\frac{1}{16}$ to $\frac{3}{4}$ inch plate, and preferably, a $\frac{1}{8}$ to $\frac{1}{2}$ inch plate.

After the initial grinding, the meat is forced through a forming tube which is surrounded by a suitable source of heat. During this extrusion, the meat is compacted by pressure and at the same time, coagulated by heat transmitted through the forming tube. While factors such as tube diameter and temperature will necessarily vary the extrusion time, the time of travel of the meat pieces through the forming tube should be sufficiently long to insure that the meat pieces will be sufficiently coagulated to maintain their form after discharge from the forming tube.

Because of the fats and juices in the meat being extruded, pockets will be formed in the coagulated meat rod, resulting in intermittent breakage of the rod as it is forced from the forming zone. In addition to this breakage, severing or comminuting of the rod by a suitable means can be resorted to when necessary in order to obtain the desired particle size in the final product.

The device illustrated in the figure shows generally one combination of apparatus suitable for practicing the instant invention. In the figure, a stuffer 10 is connected through a conventional stuffing horn 11 through a tube adapter 12 to a substantial length of coil tubing 13. The tubing is held in a container 14 by tube retainers 15 and 16. The container may contain liquid which can be heated by a heater (not shown). At the discharge end of the forming tube 17, the product enters a comminuter 18 such as a dicer where the coagulated meat is reduced to the desired size. From the comminuter 18 the coagulated meat chunks and liquid fat and meat juices enter a collecting trough 19 wherein is located a conveyor 20 which carries the mixture through a heat exchanger 21. A coolant (not shown) enters the heat exchanger at inlet 22, circulates about the conveyor 20 and exits at outlet 23.

The heating medium surrounding the forming and coagulation zone should be adequate to heat the forming mixture to a temperature sufficient to produce a set in the product. If the product is moved at about 16.7 feet per minute as would be the case in a 100 foot coiled tube, the material must be heated in the heating zone at a temperature of about 160° F. for about 6 minutes in order to obtain good coagulation of the protein. With a more rapid rate of passage of the product through the heating zone, the temperature of the zone should be higher, while much lower temperatures can be used if the rate of flow of the product is reduced. The length of the tubing being heated in the heating zone is a factor controlling the amount of heat to be applied since with a long forming zone the product is present in the heating zone for a long period of time and it is not necessary to heat to as high a temperature as would be the case with an abbreviated heating zone to reach the desired attainment temperature. Those skilled in the art can easily adjust the heating temperatures and required residence time for the moving product in the heating zone for a given length of forming tube in the heating zone. Under proper temperature and time conditions, the product undergoes partial coagulation sufficient to impart to the meat a self-sustaining structure of sufficient strength to permit handling and subsequent operations including additional cooking, if required.

In regard to operating temperatures, the meat pieces are generally at a temperature of about 30–90° F. at the time of entrance into the forming tube. In order to avoid premature coagulation, the meat pieces should not obtain a temperature in excess of about 110° F. prior to passage into the forming zone. Generally speaking, the meat entering the forming zone should be at a sub-coagulation temperature, i.e., a temperature below that at which the meat will set up in about 15 minutes if held at that temperature. In the forming zone, the temperature of the product is raised to at least about 120° F. and generally not substantially in excess of about 250° F. during passage through the forming and shaping zones. The temperature of the liquid in the bath in which the tubing is immersed will, of course, be varied depending upon the length of time during which the product is moved through the heating zone. The product will desirably be moved more rapidly when the liquid in the bath is held at a high temperature and more slowly when the liquid is held at a lower temperature. Usually, the liquid in the heating zone is water which is held at a temperature of about 150–212° F. for best results. Higher temperatures up to about 300° F. may be employed if hot air is used or the liquid in the bath is a high boiling oil for example.

As the diced coagulated meat chunks pass into the collecting trough they are mixed with the liquid fat and meat juices which collect in the forming zone and pass automatically through the comminuter. This mixture is then passed through a suitable heat exchanger which reduces the temperature sufficiently to congeal the liquids about the meat chunks in the same ratio as the fresh meat. Thereafter the product may be metered directly into the final product or stored under refrigeration for later processing.

The physical nature of the material used in making up the forming zone is not important in the present invention due to the lubricating properties of the fats and juices present in the meat pieces being coagulated. Material suitable for this purpose include thermoplastic resins, such as, medium density polyethylene, polypropylene, Teflon and cellulose acetate butyrate. Such materials as polystyrene, stainless steel and Pyrex glass are also suitable in the present invention.

Specific embodiments of the invention are illustrated in the following examples. It should be understood that these examples are set forth herein in the illustrative sense and should not be interpreted as imposing any limitation on the invention.

EXAMPLE I

Meat chunks were prepared from the following formulation:

| | Pounds |
|---|---|
| Boneless short plates | 126 |
| Milk powder | 3¾ |
| Salt | 4¾ |
| Spices | 2½ |

The boneless short plates were ground through a ⅛ inch plate, the above ingredients being added along with the meat as the meat went into the grinder. The ground formulation was then extruded through a coil of polypropylene tubing immersed in a tank of hot water (175–180° F.). The meat was extruded at such a rate as to give an internal meat temperature of 135° F. after passing through 100 feet of tubing. The resultant coagulated meat, fat and juices were then passed through a dicer, remixed and chilled to coagulate the liquid juices and fat about the diced meat chunks and metered directly into a batch of chili.

EXAMPLE II

The following ingredients were ground through a ½ inch plate:

| | Pounds |
|---|---|
| Beef | 108 |
| Skim milk powder | 3 |
| Salt | 3 |
| Spices | 1¾ |

After grinding through ¾ inch plate the material was forced through a coil of polyethylene tubing 6 feet long, one inch in outside diameter and ⅛ inch in wall thickness. The coil was surrounded by water held at a temperature of 150° F. Using a flow rate of 6 minutes, the coagulated meat pieces obtained an internal temperature of 127° F. Upon leaving the forming tube, some subdivision was obtained by reason of the presence of liquid fat and juices within the material being extruded. Additional subdivision was obtained with a dicer and both the liquid juices and diced meat were chilled to coagulate the liquids about the meat items. The resultant material was observed to be entirely satisfactory for incorporation into canned meat items and exhibited a texture and shape-retention comparable to most chunks prepared by more expensive and time consuming prior art methods.

The term "meat" as used in the foregoing description is intended to include the flesh of quadrupeds, fowl and fish. It is important, however, that the subdivision of the meat not be carried out so as to go below a minimum particle of ¹⁄₁₆ inch such as is obtained by passing of the meat through a ¹⁄₁₆ inch grinder plate.

Obviously, many modifications and variations of the invention as hereinbefore set forth may be made without departing from the spirit and scope thereof, and, therefore, only those limitations should be imposed as are indicated in the appended claims.

I claim:
1. A method of continuously preparing coagulated meat chunks having the same ratio of fat and meat juices as fresh meat comprising:
   comminuting fresh meat to a cross-section of between ¹⁄₁₆ to ¾ inch, said meat after comminution having a temperature between from about 30° F. to about 110° F.;
   continuously forcing said coarsely comminuted meat through a forming zone thereby compacting each said meat particle into intimate contact with the other surrounding meat particles and simultaneously heating said compacted meat particles to an internal temperature of at least 120° F. from a heat source surrounding said forming zone for a time sufficient to coagulate the meat proteins;

reducing the coagulated meat to a desired particle size;

mixing said coagulated meat particles with the liquid fat and meat juices separated during the coagulation step; and chilling said mixture to congeal said liquid fats and juices about the coagulated meat particles in substantially the same ratio as a fresh meat.

2. The method of claim 1, wherein the reduced meat pieces are heated to an internal temperature of from about 120° F. to about 250° F. prior to removal from said forming zone.

3. The method of claim 1, wherein the heat is supplied by a liquid bath surrounding said forming zone.

4. The method of claim 1, wherein various optional ingredients and spices are combined with the fresh meat prior to coagulation of the meat proteins.

5. The method of claim 1, wherein the final product is stored under refrigeration for subsequent processing.

6. The method of claim 1, wherein the final meat product is added directly to another food product suitable for canning.

7. The method of claim 6, wherein said other food product is chili.

References Cited
UNITED STATES PATENTS 2,860,991  11/1958  Christianson et al. ____ 99—109
3,346,394  10/1967  Rongey et al. _____ 99—109

HYMAN LORD, Primary Examiner

U.S. Cl. X.R.
99—107